United States Patent [19]

Robbi

[11] 4,011,563
[45] Mar. 8, 1977

[54] VARIABLE RANGE AUTOMOTIVE RADAR SYSTEM

[75] Inventor: Anthony Drea Robbi, East Amwell Township, Hunterdon County, N.J.

[73] Assignee: RCA Corporation, New York, N.Y.

[22] Filed: Feb. 6, 1976

[21] Appl. No.: 655,841

[52] U.S. Cl. .......................................... 343/7 VM
[51] Int. Cl.² .......................................... G01S 9/02
[58] Field of Search .............................. 343/7 VM

[56] References Cited

FOREIGN PATENTS OR APPLICATIONS 2,050,358   4/1972   Germany .................. 343/7 VM Primary Examiner—T.H. Tubbesing
Attorney, Agent, or Firm—Edward J. Norton; Joseph D. Lazar; Michael A. Lechter

[57] ABSTRACT

An automotive ranging and detecting system wherein clutter returns from out of lane objects at curves in a road are eliminated by adjusting the maximum range of the radar in accordance with the radius of curvature of the path of travel of the vehicle.

10 Claims, 5 Drawing Figures

VARIABLE RANGE AUTOMOTIVE RADAR SYSTEM

BACKGROUND OF THE INVENTION

1. Field of the Invention

The present invention relates to collision avoidance radars, and more particularly to a ranging and detecting system for an automotive radar.

2. Description of the Prior Art

Conventional non-cooperative radar detecting and ranging systems, wherein a probe signal is transmitted towards a target and is "skin"-reflected therefrom back to the interrogating unit, have typically been impractical for utilization as automotive collision avoidance systems due to undesired signals known in the art as "clutter." Clutter returns from extraneous targets such as fixed objects along a roadway or moving vehicles in non-critical spatial relationships to the interrogating vehicle, for example, vehicles in another lane, are not distinguishable from reflections from targets in critical relationship to the interrogating vehicle. Clutter returns thus cause a false alarm problem whereby driver alert indicators, automatic braking, or passenger restraints, such as air bags, may be inopportunely employed.

The majority of clutter returns occur when a vehicle is traveling along a curving road and receives returns from vehicles in non-critical adjacent lanes and stationary targets along the shoulder of the road. For a more detailed discussion of such clutter problem, reference is made to Department of Transportation Report DOT HS-801 011 "Analysis of Problems on the Application of Radar Sensors to Automotive Collison Prevention", Wood, Chandler, and Warner; Final Report, December 1973-Contract DOT-HS-314-3-601.

To reduce road curve clutter, systems have been proposed wherein the radiation pattern of the radar probe signal is changed in direction in accordance with the position of the steering wheel. However, oversteer or understeer in the steering mechanism make such a system impractical. In addition, even if the probe signal were properly directed, the clutter would not be eliminated, but rather only reduced. Such systems are referred to in the above-mentioned DOT report by Wood, Chandler and Warner.

Cooperative systems, wherein the radar is responsive only to specifically tagged targets which tagged targets are capable of generating a reply signal that is in some way distinguishable or discriminated from radar probe signals and from skin reflections, are not subject to clutter. Such a cooperative detecting and ranging system is disclosed in U.S. Pat. No. RE.28,302 to Staras et al., issued Jan. 14, 1975. Cooperative systems, however, do not respond to untagged targets or to targets having inoperative tags. Hence, the efficacy of cooperative systems as automotive detecting and ranging systems is dependent upon acceptance and use of the system by the driving public at large and upon proper maintanance of the tag.

The above-mentioned copending application "Dual Mode Automobile Collision Avoidance Radar" by Sterzer and Kaplan, Ser. No. 593,016 describes a dual mode system comprising a continuous wave frequency modulated (FM-CW) radar which responds to reply signals from tagged targets and to skin reflections from proximate untagged targets, reducing thereby the radars sensitivity to clutter. Such a dual mode system, however, is at long ranges responsive to only tagged targets. Accordingly, a non-cooperative radar system wherein clutter returns from targets outside of the lane of travel of the interrogating vehicle are ignored is desirable.

SUMMARY OF THE INVENTION

The present invention provides a vehicular ranging and detecting system wherein the maximum range of the system is altered in accordance with the radius of curvature of the travel of the vehicle to eliminate thereby clutter from out of lane targets.

DETAILED DESCRIPTION OF PREFERRED EMBODIMENT

Figure 1:
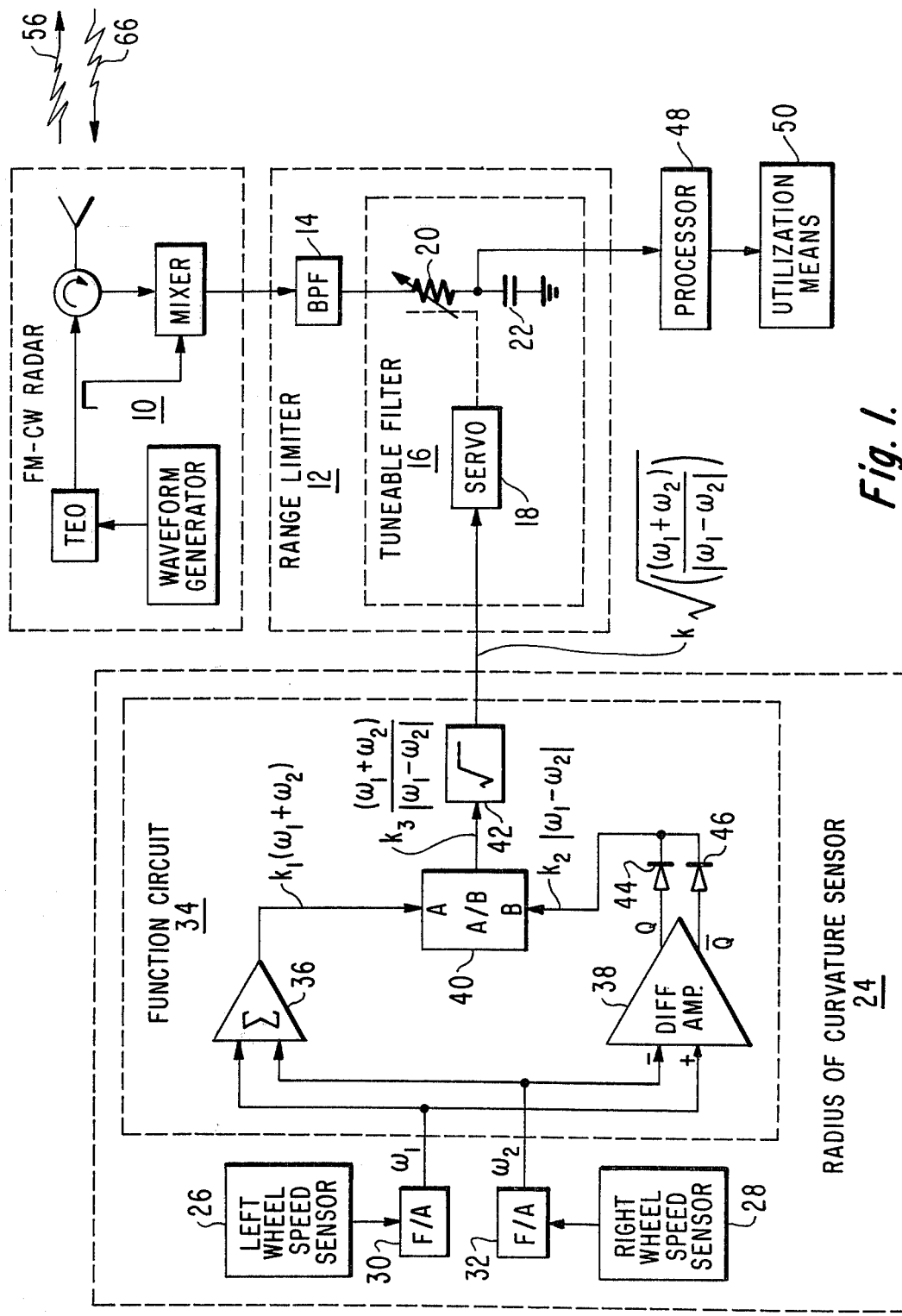
FIG. 1 is a block diagram of a ranging and detecting system in accordance with the present invention.

Referring to FIG. 1 there is shown a frequency-modulated continuous-wave (FM-CW) radar 10, such as described in copending application Ser. No. 593,016 by Sterzer and Kaplan "Dual Mode Automobile Collision Avoidance Radar", coupled to a range limiter 12. Range limiter 12 comprises a conventional bandpass filter 14 coupled to a tunable filter 16. Tunable filter 16 suitably comprises a servo mechanism 18 coupled to a potentiometer 20, the potentiometer cooperating with a capacitor 22 to form a low pass filter. Servo 18 is receptive of control signals from a radius of curvature sensor 24. Radius of curvature sensor 24 suitably comprises left and right wheel speed sensors 26 and 28 coupled through conventional frequency to analog converters (F/A) 30 and 32 to the respective input terminals of a two input function circuit 34. Either the front or rear wheel pair of the vehicle may be used.

Function circuit 34 comprises conventional components: a two input summing amplifier 36; a differential amplifier 38 such as an RCA CA3000; a divider 40, and a square root circuit 42.

The output signal of F/A 30 is applied to one input terminal of summer 36 and to the positive input terminal of differential amplifier 38. Similarly, the output signal of F/A 32 is applied to the other input terminal of summer 36 and the negative input terminal of differential amplifier 38. The output signal of summer 38 is applied to the dividend input terminal (A) of divider 40. Differential amplifier 38 generates complimentary output signals, which are respectively applied through diodes 44 and 46 to the divisor input terminal (B) of divider 40. The output terminal of divider 40 is coupled to square root circuit 42, which is, in turn, coupled to servo 18. A suitable divider 40 and a square root circuit 42 are described in "Operational Amplifiers: Design and Applications", J. G. Graene, et al eds., McGraw-Hill, N. Y. 1971, pp. 275–280. An alternative embodiment of radius of curvature sensor 18 will be described in conjunction with FIG. 3. The output terminal of tunable filter 16 is coupled to a processor 48. Processor 48 suitably comprises means for detecting the frequency of the output signal of tunable filter 16. Suitable processors 48 are described in U.S. Pat. No. 3,968,492 entitled "Adaptive Parameter Processor for Continuous Wave Radar Ranging System" issued July 6, 1976 to G. S. Kaplan and, U.S. Pat. No. 3,974,501 entitled "Improvement to Adaptive Parameter Range Measurement" by A. D. Ritzie, issued Aug. 10, 1976, both assigned to the same assignee as is the present invention. Processor 48 is coupled to suitable utilization means 50 such as a display, an alarm, braking and throttle controls, or a passenger restraint, such as an air bag, or a combination of two or more of the aforementioned. A description of suitable utilization means 50 in cooperation with a compatible processor 48 may be found in an article by J. Shefer and R. J. Klensch, entitled "Harmonic Radar Helps Autos Avoid Collision," IEEE Spectrum, Vol. 10 Page 38, May 1973.

Figure 2:
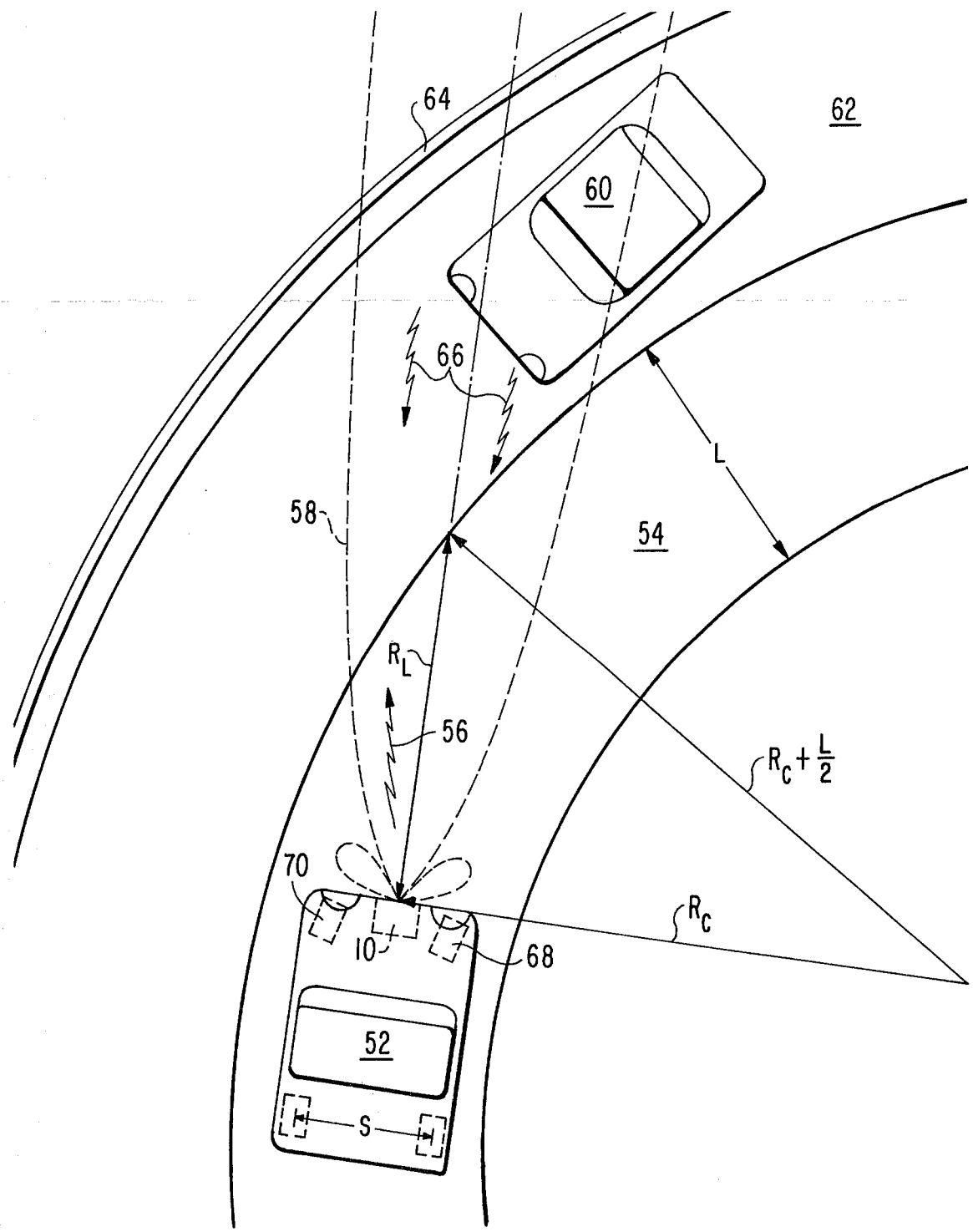
FIG. 2 is a diagram illustrating geometric relationships concerning the present invention.

Referring now to FIGS. 1 and 2, the operation of the detecting and ranging system depicted in FIG. 1 will be described. The ranging and detecting system is affixed to an interrogating vehicle 52. Vehicle 52 travels in a road lane 54 having a width L and a radius of curvature $R_C$. FM-CW radar 10 radiates a probe signal 56, in accordance with a radiation pattern 58 having a main lobe directed along the direction of forward travel of vehicle 52. Probe signal 56 is a continuous-wave signal frequency modulated in accordance with a predetermined waveform, typically a triangular wave. Probe signal 56 irradiates objects within radiation pattern 58, such as vehicle 60 in adjacent lane 62 and roadside guardrail 64. Signals 66 reflected from such objects (60, 64) are received by radar 10. The round trip transit times between interrogating vehicle 52 and the respective reflecting objects (60, 64) cause delays in the reflected signals 66 with respect to the instantaneous probe signal 56, which delays, due to the FM modulation of probe signal 56, are manifested by a difference in frequency between the reflected signals 66 and the instantaneous probe signal 56. FM-CW radar 10 mixes reflected signals 66 with a signal indicative of the instantaneous probe signal 56 to generate an output signal having a frequency indicative of the round trip transit time, and hence the range, of the remote objects from interrogating vehicle 52. However, it should be noted, that any objects outside of lane 54, for example, vehicle 60 and guardrail 64, are in noncritical spatial relationship to interrogating vehicle 52, and signals 66 reflected from such remote objects are clutter, which could cause inopportune deployment of utilization means 50.

In accordance with the present invention, range limiter 12 operates to filter out reflected signals 66 from remote objects outside of the critical spatial area defined by lane 54 and to pass only signals 66 from targets within lane 54. The radius of curvature of lane 54 is defined at the center of lane 54, and, as noted above, radiation pattern 58 is directed along the direction of forward travel of vehicle 52. Accordingly, the maximum range $R_L$ of an object within radiation pattern 58 in critical spatial relationship with vehicle 52 is defined by one leg of a right triangle, the other leg of the triangle having a length equal to the radius of curvature $R_C$ and the hypotenuse of the triangle being equal to the radius of curvature $R_C$ plus one half of lane width L. Accordingly, the maximum critical range $R_L$ may be expressed:

$$R_L = \sqrt{L(R_C + L/4)} \quad (1)$$

In practice $L/4$ is negligable with respect to $R_C$ and accordingly, equation (1) simplifies to $$R_L = \sqrt{R_C L} \quad (2)$$

Since the frequency of the output signal of FM-CW radar 10 is indicative of the range, bandpass filter 14 operates to establish the ultimate maximum and minimum ranges of the ranging system, for example 150 meters to 10 meters, by blocking frequencies corresponding to ranges beyond such ultimate maximum and minimum ranges. In accordance with the present invention, tunable filter 16 operates to set the maximum acceptable range, hereinafter termed the critical range, of the system in accordance with the radius of curvature. Specifically, tunable filter 16 blocks frequencies corresponding to ranges beyond a maximum critical range $R_L$ in accordance with equation (1).

The radius of curvature $R_C$ of the travel of interrogating vehicle 34 is a function of the difference in angular wheel speeds that is, as shown in FIG. 1, the difference in angular speed between the right wheel 68 and left wheel 70 of vehicle 52. Specifically, the radius of curvature is approximated by the product of the ratio of average angular wheel speed $\omega_0$ to the difference $\Delta\omega$ between the right and left angular wheel speeds, the ratio multiplied by the distance S between the right and left wheels. That is:

$$R_C = \left(\frac{\omega_v}{\Delta\omega}\right) S \quad (3)$$

Substituting equation (3) into equation (2), equation (2) results in:

$$R_L = \sqrt{\left(\frac{\omega_o}{\Delta\omega}(SL)\right)} = \sqrt{\left(\frac{LS}{2} \frac{(\omega_1 + \omega_2)}{|\omega_1 - \omega_2|}\right)} = K\sqrt{\left(\frac{(\omega_1 + \omega_2)}{|\omega_1 - \omega_2|}\right)} \quad (4)$$

$$\text{where } K = \sqrt{\frac{LS}{2}}$$

Left and right wheel speed sensors 26 and 28, in cooperation with frequency-to-analog converters 30 and 32 generate analog signals respectively indicative of the left and right angular wheel speeds.

Function circuit 34 operates to generate a signal indicative of the radius of curvature, in accordance with equation (4). In particular, summer 36 and differential amplifier 38 respectively generate signals representative of the sum and the absolute value (magnitude) of the difference of the respective right and left angular wheel speeds. The magnitude of the difference in frequencies is utilized to ensure that right and left hand turns by vehicle 52 have the same range limiting effect. The output signal of divider 40 is thus representative of the ratio of the average angular wheel speed to the difference between right and left angular wheel speeds, and the output signal of square root circuit 42 is representative of the radius of curvature $R_C$ in accordance with equation (4), where component constants are appropriately chosen.

Servo 18 varies the resistance of potentiometer 20 in accordance with the control signal from function circuit 34, varying thereby the frequency pass-band of tunable filter 16, such that only those output signals of homodyne radar 10 having frequencies indicative of targets within the critical range $R_L$, and hence within lane 54, are applied to processor 48, thus avoiding erroneous deployment of utilization means 50.

Figure 3:
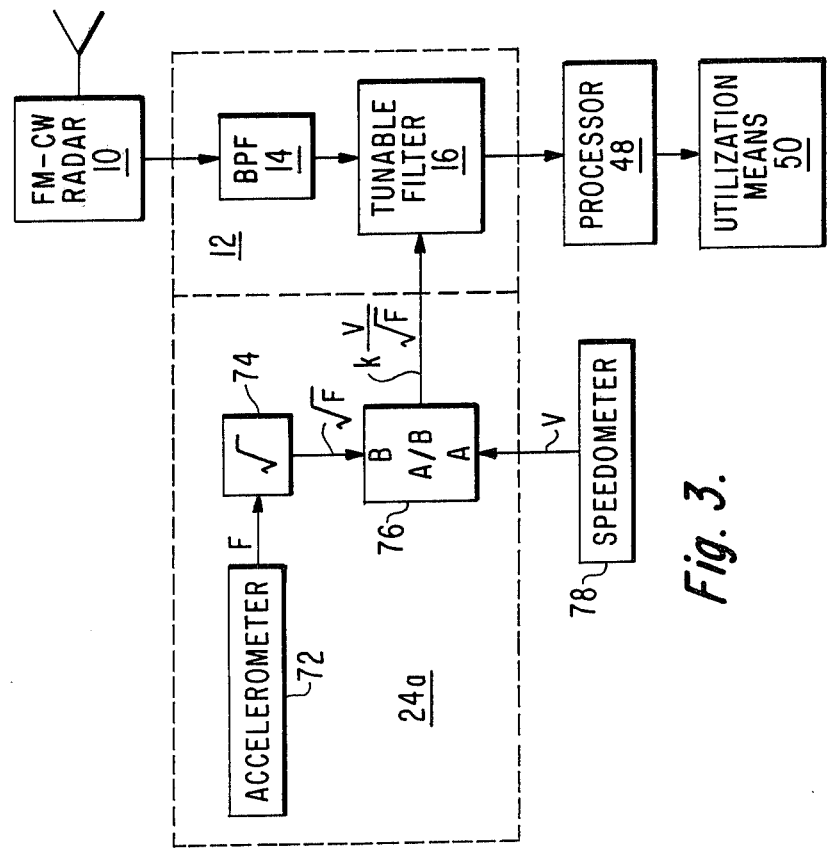

FIG. 3 depicts an alternative ranging system in accordance with the present invention wherein radius of curvature sensor 24a comprises an accelerometer 72, a square root circuit 74, and a divider 76. The output signals of accelerometer 72 are coupled through square root circuit 72 to the divisor input terminal (B) of divider 76. The dividend input terminal (A) of divider 76 is receptive of signals indicative of the vehicles forward velocity V, from, for example, the vehicle speedometer 78. The remainder of the components shown in FIG. 3 are the same as those components bearing the same numeric designation in FIG. 1. Accelerometer 72 is affixed to the cooperating vehicle in such a manner as to sense acceleration in a direction orthogonal to the direction of forward motion of the vehicle, and parallel to the roadway surface. In general, accelerometer 72 operates to sense centrifugal force F on a test mass, $m$, which mass moves in accordance with the force F, thereon. Accordingly, the force can be measured by a strain gauge. For example, a piezoelectric gauge or a magnetostrictive gauge coupled to a test mass, or a test mass comprising a slug of ferromagnetic material which moves along a given axis inside a coil, may be utilized. The centrifugal force, F, is expressed mathematically by:

$$F = mV^2/R_c \quad (5.)$$

where $V$ is the vehicle velocity in the forward direction. Accordingly, $$R_c = \frac{mV^2}{F} = K_1 \frac{V^2}{F} \quad (6)$$

where $K_1 = m$
substituting into equation (2), $$R_L = \sqrt{\left(\frac{K_1 V^2}{F}\right)^L} = \frac{K_2 V}{\sqrt{F}} \quad (7)$$

where $K_2 = \sqrt{K_1 L}$

Accordingly, utilizing proper circuit constants, the output signal of divider 76 is representative of $V\sqrt{F}$, and hence $R_L$, and is used to control tunable filter 16.

It should be appreciated from the above description that the present invention provides a particularly advantageous automotive detecting and ranging system in that clutter returns from non-critical out-of-lane objects due to curves in the road are eliminated.

Figure 4:
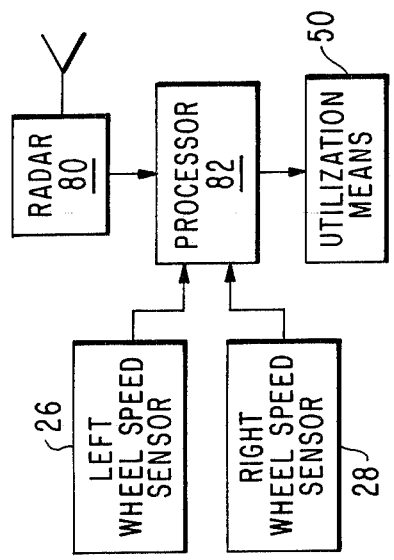
FIGS. 3, 4 and 5 are block diagrams of alternative embodiments of a ranging and detecting system in accordance with the present invention.

It should further be appreciated that radars other than FM-CW type radars may be utilized. For example, as illustrated in FIG. 4, the output signals of a radar 80 may be applied to a processor 82, which is also directly receptive of the output signals of left and right wheel speed sensors 26 and 28. Processor 82 comprises suitable logic circuitry to establish a maximum critical range in accordance with equations (1) and (3).

Figure 5:
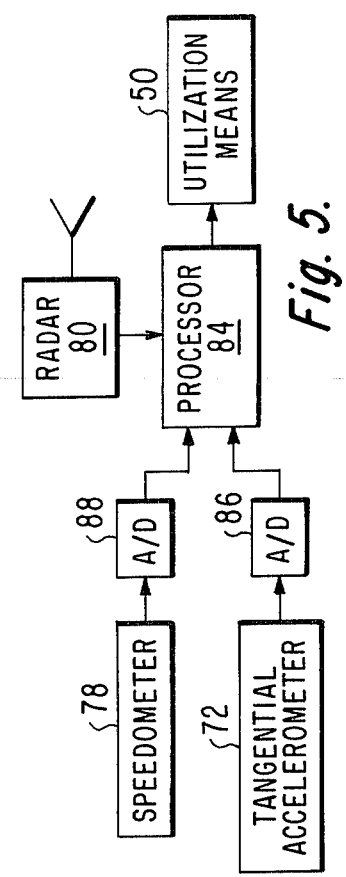

Similarly, FIG. 5 illustrates a detecting and ranging system in accordance with the present invention wherein radar 80 output signals are applied to a processor 84, which is also receptive of the output signals of tangential accelerometer 72 and vehicle speedometer 78, suitably converted to digital form by conventional analog to digital converters 86 and 88. Processor 84 comprises suitable logic circuitry to compute the maximum critical range in accordance with equations (1) and (6) above, and generates output signals to utilization means 50 accordingly.

What is claimed is:

1. In a system for detecting the presence and range of remote objects within a predetermined maximum range from a vehicle in the direction of travel of said vehicle, said direction of travel having a radius of curvature, said system being of the type including first means for generating a probe signal in the direction of travel of said vehicle, said probe signal being reflected from said remote targets back to said vehicle, and second means for receiving said reflected signals and determining therefrom the presence and range of said remote objects from said vehicle, the improvement comprising:
   third means for generating a signal indicative of said radius of curvature of said travel of said vehicle; and
   fourth means, responsive to said radius of curvature signal for altering said maximum range of said system in accordance with said radius of curvature.

2. The system of claim 1 wherein said probe signal is a frequency modulated continuous wave signal and said second means generates a signal indicative of the frequency difference between said probe and reflected signals and wherein further said fourth means comprises a tunable low pass filter responsive to said radius of curvature signal, the bandwidth of said filter being altered in accordance with said radius of curvature.

3. The system of claim 2 wherein said vehicle has right and left wheels respectively rotating at right and left angular wheel speeds, said right and left wheels having an average angular speed $\omega_o$ and being spaced apart by a predetermined distance S and wherein said third means comprises:
   fifth means for generating a signal indicative of the difference $\Delta\omega$ between said right and left angular velocities; and
   sixth means, responsive to said difference signal, for generating a signal representative of $(\omega_o/\Delta\omega)S$.

4. The system of claim 2 wherein said third means comprises an accelerometer for detecting the velocity of said vehicle in a direction perpendicular to said direction of travel.

5. The system of claim 1 wherein said vehicle has right and left wheels, respectively rotating at right and left angular wheel speeds, said right and left wheels having an average angular speed $\omega_o$ and being spaced apart by a predetermined distance S and wherein said third means comprises:
   fifth means for generating a signal indicative of the difference between said right and left angular velocities ($\Delta\omega$); and sixth means, responsive to said difference signal, generates a signal representative of $(^{10}0/\Delta\omega)S$.

6. The system of claim 1 wherein said third means comprises an accelerometer for detecting the velocity of said vehicle in a direction perpendicular to said direction of travel.

7. The system of claim 1 wherein said vehicle travels in a lane having a predetermined width L, and wherein further said fourth means comprises means, responsive to said radius of curvature signal, for generating a signal indicative of said maximum range ($R_L$) in accordance with the following formula:
$$R_L = \sqrt{(R_C + L/4)}$$
where $R_C$ is said radius of curvature.

8. The system of claim 7 wherein said probe signal is a frequency modulated continuous wave (FMCW) signal and said second means generates a signal indicative of the frequency difference between said probe and reflected signals and wherein further said fourth means comprises a tunable low pass filter responsive to said radius of curvature signal, the bandwidth of said filter being tuned in accordance with said radius of curvature.

9. The system of claim 8 wherein said third means comprises an accelerometer for detecting velocity of the vehicle in a direction perpendicular to said direction of travel.

10. The system of claim 7 wherein said vehicle has right and left wheels respectively moving at right and left angular wheel speeds, said right and left wheels having an average angular speed $\omega_o$, and being spaced apart by a predetermined distance S and wherein said third means comprises:

fifth means for generating a signal indicative of the difference between said right and left angular velocities $\Delta\omega$; and sixth means, responsive to said difference signal, generates a signal representative of $(\omega_o/\Delta\omega)S$.

* * * * *

UNITED STATES PATENT OFFICE
CERTIFICATE OF CORRECTION

PATENT NO. : 4,011,563

DATED : March 8, 1977

INVENTOR(S) : Anthony Drea Robbi

It is certified that error appears in the above-identified patent and that said Letters Patent are hereby corrected as shown below:

Top of Column 1, insert the paragraph entitled
--Cross Reference to Related Applications Of interest are the following copending applications: Serial No. 593,016 entitled "Dual Mode Automobile Collision Avoidance Radar" filed by F. Sterzer and G. S. Kaplan on July 3, 1975; and Serial No. 631,325 entitled "Stabilizing and Calibration Circuit for FM-CW Radar Ranging Systems", filed November 12, 1975 by H. C. Johnson.--

Column 7, line 2, "$(^{107}0/\Delta\omega)S$" should be --$(\frac{\omega_o}{\Delta\omega})S$--;

Column 7, line 13, "$R_L = \sqrt{(R_C + L/4)}$" should be

--$R_L = \sqrt{L(R_C + \frac{L}{4})}$--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*